United States Patent [19]

Hegge

[11] Patent Number: 5,339,689
[45] Date of Patent: Aug. 23, 1994

[54] APPARATUS FOR DETECTING VARIATIONS IN HEAT TRANSFER FOR MEASURING THE FLUID LEVEL OR THE INTERFACE BETWEEN TWO FLUIDS WITHIN A CONTAINER

[75] Inventor: Kjell Hegge, Loganlea, Australia

[73] Assignee: Pyrozone Manufacturing Pty. Ltd., Australia

[21] Appl. No.: 64,099

[22] Filed: May 20, 1993

[30] Foreign Application Priority Data

Nov. 22, 1990 [AU] Australia .............. PK 3464

[51] Int. Cl.$^5$ ........................... G01F 23/22
[52] U.S. Cl. ........................ 73/295; 340/622
[58] Field of Search ............ 73/295; 374/54; 340/622

[56] References Cited

U.S. PATENT DOCUMENTS

| | | | |
|---|---|---|---|
| 3,279,252 | 10/1966 | Barlow ............ | 73/295 |
| 3,922,658 | 11/1975 | Harper et al. ........ | 340/622 |
| 4,116,045 | 9/1978 | Potter ............... | 73/295 |
| 4,404,809 | 9/1983 | Johnson et al. ...... | 73/295 |
| 4,583,401 | 4/1986 | Schlindwein et al. ... | 73/295 |
| 4,592,230 | 6/1986 | Waring et al. ........ | 73/295 |
| 4,630,036 | 12/1986 | Ford ................ | 340/622 |

FOREIGN PATENT DOCUMENTS

| | | |
|---|---|---|
| 1698049 | 8/1971 | Fed. Rep. of Germany . |
| 220203 | 3/1985 | Fed. Rep. of Germany . |
| 3408647 | 10/1985 | Fed. Rep. of Germany . |
| 90/08304 | 7/1990 | World Int. Prop. O. . |

OTHER PUBLICATIONS

Cirovic, M. et al., "Electronic Devices, Circuits, and Systems," Prentice-Hall, Inc., 3rd Editions, pp. 261-264 (1987).
Arutyunyan, M. A., "Helium Level Gauge With Semiconductor Sensor," Instrum. & Tech. (USA), vol. 22, No. 2 (Mar.-Apr. 1979) (Publ. Oct. 1979).
Derwent Abstract Accession No. 89-184542/25, SU 1427181, Derwent Publications Ltd. (1989).

Primary Examiner—Diego F. F. Gutierrez
Attorney, Agent, or Firm—Renner, Otto, Boisselle & Sklar

[57] ABSTRACT

A level sensing apparatus for detecting variations in heat transfer for measuring the level of a fluid in a container. The apparatus has a plurality of spaced Darlington pair transistor configurations within an elongate housing. The Darlington pair transistor configurations are so positioned in the housing and biased such that their conductivity is dependent upon the cooling effects of the fluid. A predetermined potential difference is provided across each one of the respective Darlington pair transistor configurations due to the cooling effects of the fluid when in a liquid form. A potential difference lower than the pre-determined potential difference is provided due to the cooling effects of the fluid when in a gaseous form.

9 Claims, 1 Drawing Sheet

APPARATUS FOR DETECTING VARIATIONS IN HEAT TRANSFER FOR MEASURING THE FLUID LEVEL OR THE INTERFACE BETWEEN TWO FLUIDS WITHIN A CONTAINER

FIELD OF THE INVENTION

This invention concerns the detection of levels in fluid media and in particular detection of a fluid level within a container, an interface between gas and liquid within a container or the level of one or more interface between two or more liquids within a container.

BACKGROUND OF THE INVENTION

As used herein the expression "fluid" means any gas or liquid or any flowable solids such as powdered or particulate solids.

The invention, while being applicable to the situations mentioned above and others, will be described by way of example only with reference to the detection of the level of an interface between a gas and a liquid within a container. In particular, the invention will be described by way of example with reference to the detection of the level of liquid in a container where the liquid in the container is liquified carbon dioxide ($CO_2$) and when the container has $CO_2$ gas above the level of the liquid.

Carbon dioxide ($CO_2$) in its gaseous form is used in large quantities in many industries. One of the major consumers of $CO_2$ is the hotel trade in the provision of draught carbonated beverages and carbonated beverages through a reticulated supply system. Other consumers also often require $CO_2$ to be supplied in cylinders or tanks.

It has been the practice to provide some means to identify or detect the level of the liquid $CO_2$ within the cylinder and hence the quantity of liquid remaining in the cylinder. Since, in such situations the cylinder is under high pressure it is not convenient or appropriate to employ sight gauges or the like to provide an indication of liquid level. With such cylinders containing $CO_2$ in liquid form it has been the practice to provide an electro-mechanical level detecting mechanism employing a probe positioned within the cylinder and which probe had a plurality of sensors such as reed relays along the length of the probe. A float was associated with the probe and that float included a magnetic element for actuation of the reed relays. As it is difficult to completely remove moisture from bulk liquified industrial gases such as propane, butane, natural gas, $CO_2$, nitrogen and the like, there is a tendency for ice particles to accumulate on the surface of the liquid gas particularly when the liquid is cooled to below freezing by adiabatic expansion. In some cases, bulk liquid gases are stored at temperatures less than 0° C. With mechanical and electromechanical liquid level detectors, it has been found that accumulation of ice particles on the surface of the liquid gas frequently jams mechanical devices such as floats leading to quite unreliable operation of the level detector. In addition, where the storage cylinder was made of steel, fine rust particles have been found to accumulate at the liquid level and adversely affect the level sensing probe.

Liquid level sensing arrangements of a mechanical or moving nature were undesirable for reasons expressed above, were unreliable and therefore not accurate. Difficulties have also been encountered with prior art liquid level detectors for use in determining the position of an interface between fluids of differing specific gravities. Fermentation and distillation vessels typify situations wherein the positions of one or more liquid/liquid interfaces may be required to be determined for the purpose of controlling continuous processes.

A typical cylinder arrangement for $CO_2$ is illustrated as part of the schematic view shown in FIG. 4 of Australian Patent Application 67304/87. Such cylinders are provided with a heating element within the tank and adjacent the bottom of the tank, a refrigerant evaporator within the tank and at an upper end thereof, a liquid level detection device extending into the cylinder and having an elongate rod and a captive float and take off and inlet lines.

Other fluid level sensing and monitoring means are described in International Patent Application Number PCT/AU85/00265; U.S. Pat. Nos. 3,911,744, 2,963,908, 4,203,325; and Australian Patent Number 493224 and 407006.

U.S. Pat. Nos. 3,911,744 and 4,203,325 are concerned with vertically spaced electrodes which when immersed in a conducting liquid, close an electrical circuit with a laterally spaced reference electrode.

U.S. Pat. No. 2,963,908 is concerned with the measurement of levels in fluids including flowable particulate solids and utilizes capacitance measurement to detect changes in dielectric constant of a surrounding medium.

Australian Patent Number 493224 described a rod-like electrode structure comprising alternating conducting and insulating sections for liquid level a measurement or pump control. The electrode requires for its operation to be immersed in a conducting liquid.

Australian Patent Application Number 407006 described a plurality of spaced thermistors operating at a normal temperature of about 300° C. Immersion of a heated thermistor in a liquid changes its electrical resistivity and consequently the operating characteristics of a transistor operatively connected to the thermistor to switch the transistor between a nonconducting state and a conducting state.

International Patent Application Number PCT/AU85/00265 describes an electrode assembly similar to that described in Australian Patent Number 493224 except that the spaced conducting electrodes are discontinuous about the peripheral surface of the electrode body.

International Patent Application Number PCT/AU90/00017 describes an assembly of temperature dependent level sensors and a reference sensor. The level sensors are arranged or embedded within the probe and having a portion of the sensor capable of coming into contact with the liquid gas within the cylinder. The sensors in such an arrangement were prone to damage which was likely to occur during removal and replacement of the probe during construction, servicing or filing of the cylinder. In addition a reference sensor was necessary for the proper operation of the assembly.

In PCT/AU90/00017 the assembly employed transistors as sensors to detect changes in temperature resulting from a change in detection of liquid or gas within the cylinder. With liquid $CO_2$ typically the temperature involved is about −25° C. while gaseous $CO_2$ may be at a temperature of between −12° C. to −25° C. Thus the difference in temperature between gas and liquid was sometimes slight and difficult to accurately detect with sensors of the type disclosed in this earlier patent specification.

It is an object of the present invention to provide a fluid level sensor which at least alleviates or minimises some of the disadvantages referred to above.

DISCLOSURE OF THE INVENTION

According to one aspect of the invention there is provided a level sensing apparatus for sensing the level of a fluid, said apparatus including an elongate housing, a plurality of sensors within the housing, each said sensor including a high gain amplifier and a circuit with bias components to provide a predetermined output intermediate a potential difference across the amplifier when the presence of fluid is detected and an output lower than the predetermined output when the presence of gas is detected.

Preferably at least four sensors are present. The sensors may be arranged at even or uneven spacings along the housing. The sensors may be able to detect whether the fluid within the cylinder is at a full, three quarter full, half full, quarter full and empty. Thus five sensors may be present. Clearly where equal fluid level gradations are not required the level sensors may be located along the housing at unequal spacing.

The sensors, as indicated above, comprise high gain amplifiers. Preferably cascade connected transistors are used. In one embodiment a Darlington pair configuration of cascade emitter followers is employed.

Each sensor has bias components. These components may comprise resistors. The resistors may be present in the base and collector/emitter circuits of the transistors. Preferably one of the resistors provides a small amount of negative feedback.

A comparator may be associated with each sensor to provide a level indicative signal in response to an output from the sensor. An integrated circuit comparator is preferred although the comparator may be implemented employing discrete components.

An indicator providing a visual and/or audible output indicative of level may be coupled to the comparator. Preferably a visual indicator is coupled to the comparator. In one embodiment an LED is coupled to the comparator and indicates the state of the comparison made by the comparator.

BRIEF DESCRIPTION OF THE DRAWINGS

A particular preferred embodiment of the invention will now be described by way of example with reference to the drawings in which.

DETAILED DESCRIPTION OF THE DRAWINGS

Figure 1:
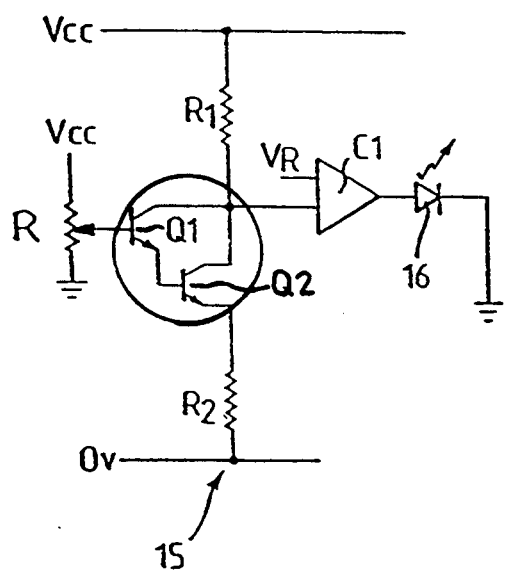
FIG. 1 is a circuit diagram of a sensor and connecting circuitry according to an embodiment of the invention.

In FIG. 1, the sensor comprises transistors Q1 and Q2 are arranged as cascade connected emitter followers in a Darlington pair configuration package. This configuration not only yields an amplifier having a relatively high input impedance but the gain is also higher than a single emitter follower. Resistor R1 is a current limiting resistor and resistor R2 provides a small amount of negative feedback to the transistors. Resistor R sets the base current for the amplifier. With VCC of 24 VDC resistors R, R1 and R2 are chosen such that the collector electrodes of the transistors are typically at a potential of about 14 VDC when the sensor is under the influence of liquid. When the sensor is under the influence of gas and the transistors conduct, the collector electrodes are typically at a potential of 9 to 10 VDC. The high gain of the Darlington pair, the negative bias and the choice of current limit resistor R1 ensure that quick and precise switching occurs when the sensor temperature is affected by the presence of liquid or gas.

The collector electrodes are coupled to comparator C1. An indicator, such as LED 16 is coupled to the output of C1. Comparator C1 has a reference voltage input which may typically be coupled to a reference voltage VR of 12 VDC. The comparator provides an output when the sensor is under the influence of gas. The magnitude of VR need not be 12 VDC but if so chosen the operation is optimised.

A plurality of sensors 15 like that shown in FIG. 1 are arranged at intervals along an elongate housing within a cylinder of fluid. The sensors are positioned against the inner surface of the housing and are separated from the fluid by the housing and do not physically contact the fluid. The heat generated from the Darlington pair configuration sensors is cooled by the effects of the presence of a fluid in a liquid or a gaseous form. When the fluid is in a gaseous form, the cooling effects are less than the cooling effects of the fluid when in a liquid form. Therefore, the junction temperature of a Darlington pair transistor sensor will vary depending upon whether or not it is being cooled by a liquid or a gas. The sensors therefore are under the influence of fluid or gas depending upon the level of the fluid within the cylinder. When a sensor is under the influence of liquid $CO_2$ its temperature is lower than what would be the case if the sensor was under the influence of gas. Thus the current flowing through the Darlington pair is smaller when the temperature is lower and a smaller voltage drop is developed across Resistor R1.

Each sensor has a comparator associated with it and the outputs provided by these comparators may be coupled to LED's to provide an indication of the liquid level.

Since the cascade connected transistors have a high gain, the response of the sensors to temperature gain is quite rapid and pronounced. In view or this function a reference sensor is not necessary.

Figure 2:
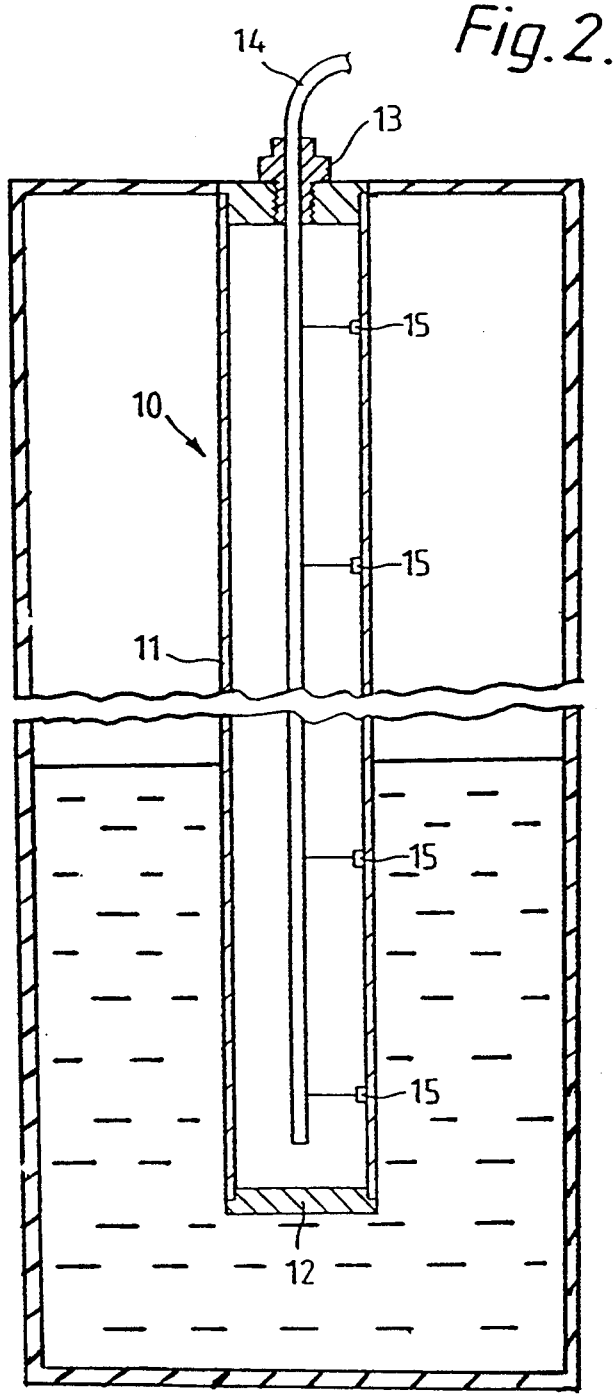
FIG. 2 is a diagrammatic view showing how sensors may be mounted in use.

The sensors 15 are arranged in an elongate housing 10 is shown in FIG. 2. The housing is insertable into a cylinder. The sensors are arranged adjacent the inner surface of tube 11 and because of the high gain of the sensors, they need not project through openings in the tube 11 and into contact with the fluid/gas. In this way the likelihood of the sensors being damaged is minimised. The tube 11 is closed off at one end by plug 12 and by a gland 13 at its other end. A cable 14 achieves electrical connection for the sensors.

I claim:

1. A level sensing apparatus for sensing the level of a fluid including an elongate housing with a plurality of spaced Darlington pair transistor configurations positioned therein, each one of said Darlington pair transistor configurations being so positioned in the elongate housing and biased with bias components such that the conductivity of each one of said Darlington pair configurations is dependent upon the cooling effects of the fluid, wherein a potential difference above a pre-determined threshold level is provided across each one of said Darlington pair transistor configurations due to the cooling effects of the fluid when in a liquid form, and a potential difference lower than the predetermined threshold level is provided due to the cooling effects of the fluid when in a gaseous form.

2. The apparatus of claim 1, wherein said housing separates each of the said Darlington pair transistor configurations from the fluid.

3. The apparatus of claim 2, wherein the bias components include a first resistor in the collector path of each one of said Darlington pair transistor configurations and a second resistor in the emitter path of each one of said Darlington pair transistor configurations.

4. The apparatus of claim 3, wherein the bias components further include a variable resistor at the base of each one of said Darlington pair transistor configurations.

5. The apparatus of claim 4, wherein a collector output of each one of said Darlington pair transistor configurations is coupled to an input of a comparator and a reference voltage is coupled to a second input of the comparator, wherein the comparator has an indicator connected to its output, the indicator providing a signal indicative of the output voltage of the comparator.

6. The apparatus of claim 3, wherein the bias components of each one of said Darlington pair transistor configurations are chosen to provide a collector voltage of about 14 VDC due to the cooling effects of the fluid when in a liquid form, and a collector voltage of 9 to 10 VDC due to the cooling effects of the fluid when in a gaseous form.

7. The apparatus of claim 3, wherein a collector output of each one of said Darlington pair transistor configurations is coupled to an input of a comparator and a reference voltage is coupled to a second input of the comparator, wherein the comparator has an indicator connected to its output, the indicator providing a signal indicative of the output voltage of the comparator.

8. The apparatus of claim 7, wherein the reference voltage is about 12 VDC.

9. The apparatus of claim 7, wherein said indicator is a light emitting diode.

\* \* \* \* \*